June 27, 1950 — H. A. SKOG — 2,512,688
PEACH PITTING BLADE AND METHOD OF MAKING THE SAME
Filed Jan. 6, 1949 — 2 Sheets-Sheet 1
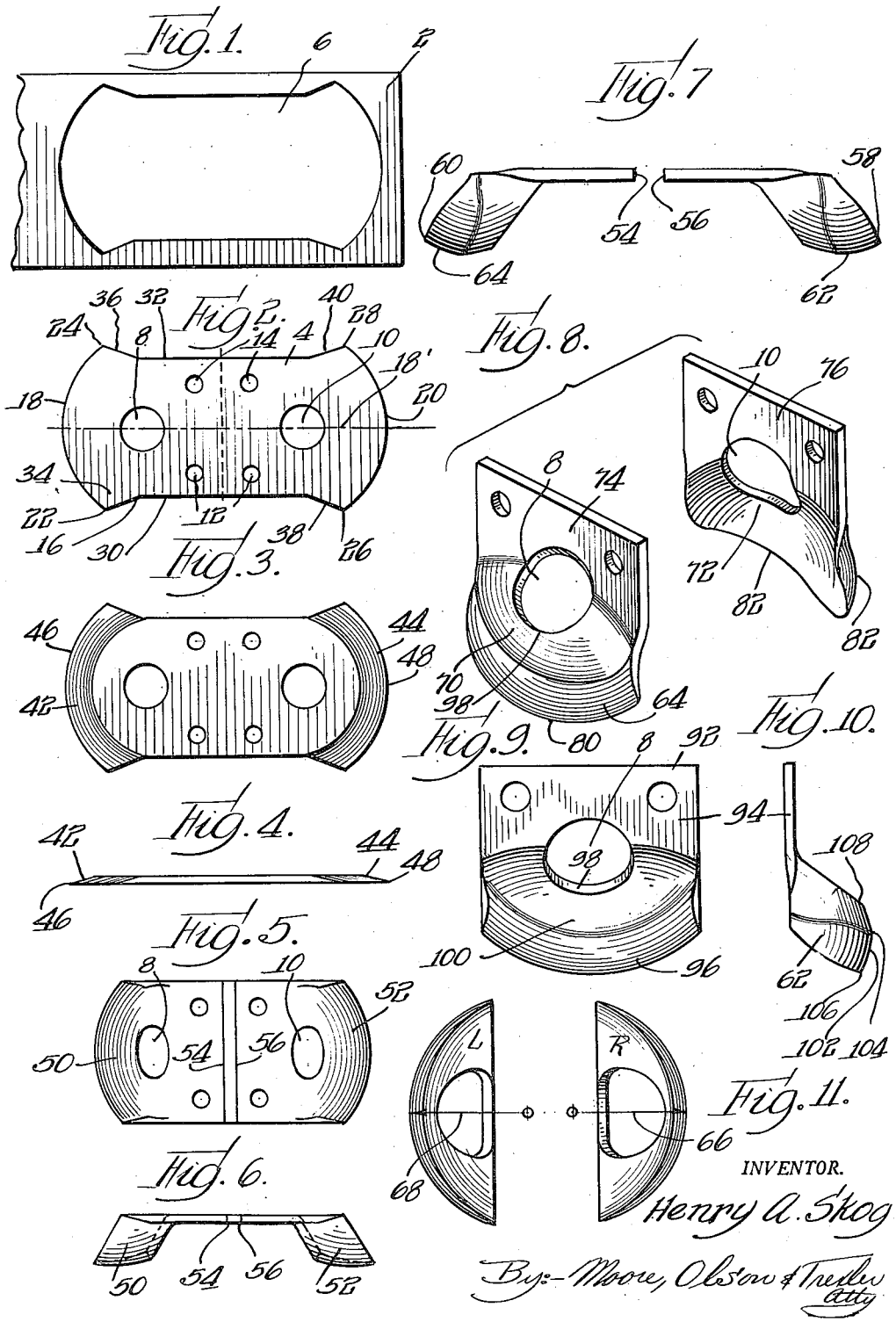
INVENTOR.
Henry A. Skog
By:- Moore, Olson & Trexler
Atty June 27, 1950  H. A. SKOG  2,512,688
PEACH PITTING BLADE AND METHOD OF MAKING THE SAME
Filed Jan. 6, 1949
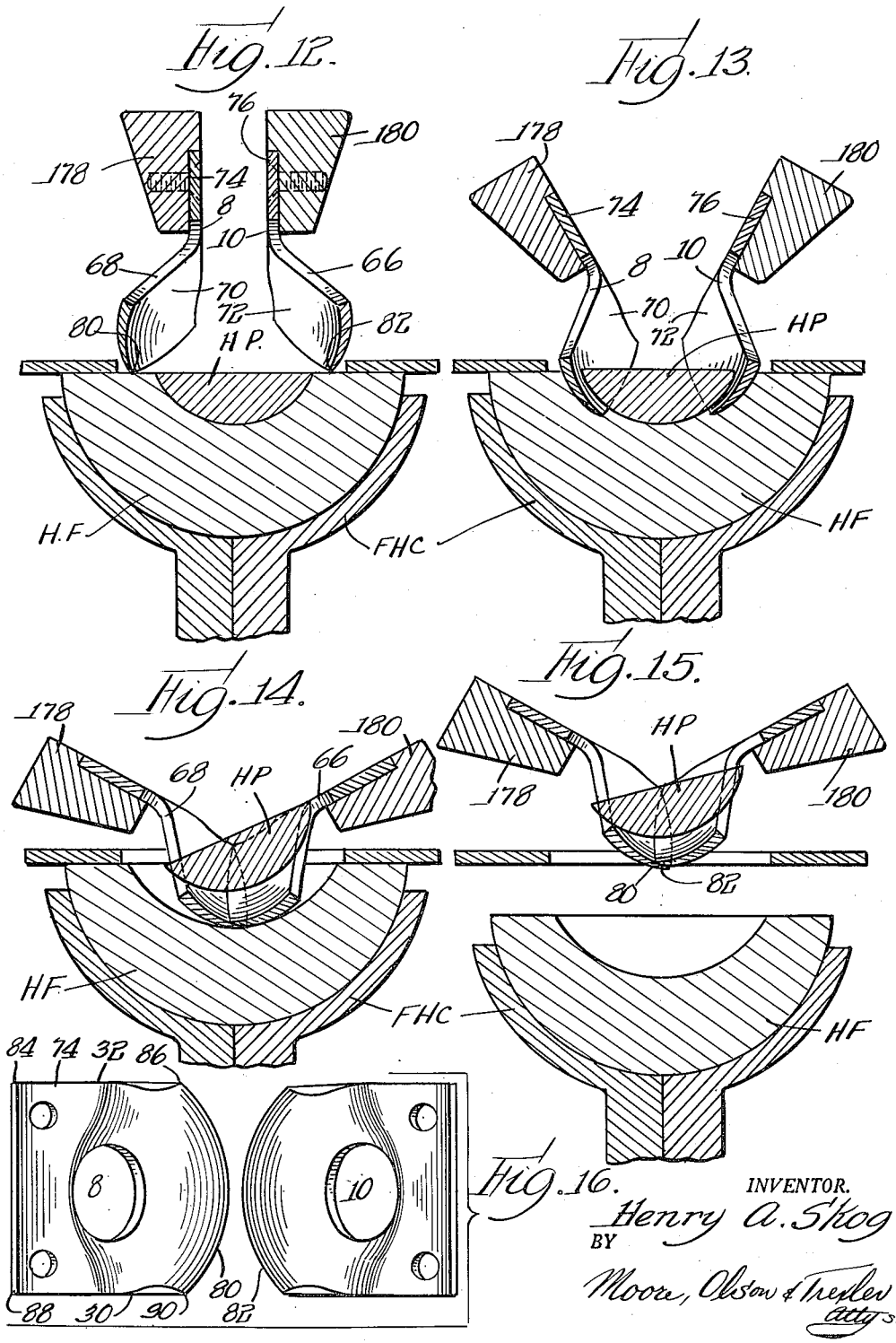
INVENTOR.
Henry A. Skog
BY
Moore, Olson & Trexler
attys.

Patented June 27, 1950

2,512,688

UNITED STATES PATENT OFFICE 2,512,688

PEACH PITTING BLADE AND METHOD OF MAKING THE SAME

Henry A. Skog, Olympia, Wash., assignor to Special Equipment Company, Portland, Oreg., a corporation of Oregon Application January 6, 1949, Serial No. 69,426

5 Claims. (Cl. 146—28)

This invention relates to the method of making pitting blades for pitting peaches, particularly clingstone peaches, and also to the pitting blade as an article of manufacture.

One of the objects of the present invention is to provide an improved method for making peach pitting blades for attachment to a power operated machine, there being a pair of such blades cooperating to pit a half peach, and wherein the blades are moved arcuately through the flesh of the fruit in a path substantially to correspond to the peripheral outline of the peach, whereby to form a smooth peach cavity in the face of the peach while at the same time removing the minimum of the flesh of the peach during the pitting operation.

Another object of the invention resides in the method of producing a pitting blade, and particularly a pair of pitting blades, for a power operated peach pitter which plates cooperate and simultaneously move in a pair of cooperating paths around and close to the periphery of a half pit of a half peach to pit the same, the blade being provided with an opening formed in its curved surface to permit a curved portion of the periphery of the peach to project therethrough during the pitting operation whereby to facilitate the pitting operation.

Yet another object of the invention resides in providing an improved method of forming pitting blades and particularly a pair of pitting blades forming a single blank of sheet metal and wherein a pair of blades are punched out of sheet metal and are suitably perforated in a manner hereinafter claimed, are then bevelled, and then formed to provide curved portions for the blades, after which the edges of the blades are ground to cutting sharpness in the manner hereinafter described.

Yet another object of the invention resides in providing a peach pitting blade, and particularly a pair of peach pitting blades for pitting half pits of half peaches, the blades being formed in the manner disclosed and for the purposes disclosed.

These and other objects of the invention will be apparent from a perusal of the following specification when taken in connection with the accompanying drawings, wherein:

Figure 1 is a plan view of a strip of metal from which a blank is punched out by appropriate punching mechanism;

Figure 2 is a top plan view of the punched out blank after the same has been provided with the appropriate holes, as described in the specification;

Figure 3 is a view of the blank with the opposed cutting ends bevelled;

Figure 4 is a side view of Figure 3;

Figure 5 is a view of the blank after it has been placed in a forming die and bent to the form shown in side section in Figure 6;

Figure 6 is a view showing the blank after the same has had the cutting edge ground to cutting sharpness;

Figure 7 shows the blank cut in two to provide the two blades;

Figure 8 shows the two blades as they are formed and finished and ready for use;

Figure 9 is an inside view of one of the blades;

Figure 10 is a side view of one of the blades;

Figure 11 is a bottom view of the two blades, showing the cutting edge;

Figure 12 is a view of the two blades as they are mounted on the power operated pitter for simultaneously cutting around the bottom periphery of a half pit;

Figure 13 is a view showing how the blades have made a partial cut around the underside of the half pit;

Figure 14 is a still further view showing the manner in which the edge of the pit section projects slightly through the openings in the curved portion of the blade;

Figure 15 is a view showing the manner in which the blades overlap in pitting the peach; and Figure 16 is an inside view of two blades, showing more clearly the curved bulged out portions and cutting edges of the blades.

Referring now particularly to Figures 1 to 11 inclusive, the same illustrate the method of producing the blade or pair of blades for utilization in a power operated pitter mechanism, such for instance as that illustrated in my application Serial No. 747,299, filed May 7, 1947, entitled "Fruit Pitting Mechanism," wherein there are shown a pair of power operated blade carriers 178 and 180 mounted on a pitter head, not shown, and suitably operated as by the means shown in the above entitled application to which reference is herewith made for a fuller disclosure for operating the blades in the manner shown in Figures 12 to 15 inclusive whereby closely to follow the outlines of a half pit HP imbedded in the flesh of a half fruit marked HF and suitably held in a fruit holding means such as the fruit holder cups FHC.

Referring now to the method of making the blades, I start with a strip of sheet metal 2 which is approximately two and five-eighths inches wide by .109 inch thick. This strip is preferably stainless steel. The first operation is to punch out of this strip of metal a blank 4, leaving a cut out portion 6 in the strip of the conformation shown in Figures 1 and 2. The second operation comprises punching out the holes 8 and 10 from the blank and intermediate smaller holes 12 and 14. The holes 8 and 10 are preferably 1⅜ of an inch in diameter. The dotted line marks the approximate center of this blank with respect to the longitudinal central axis 18' thereof. The holes 8 and 10 are each punched out substantially midway between the central transverse axis 16 which passes through the point 16 and the curved ends 18 and 20 of the blank. These curved ends extend from the points 22 and 24 at one end and from the points 26 and 28 on the other end. The points 22, 24, 26 and 28 are disposed substantially laterally of the side edges 30 and 32 of the blank, the diagonal edge lines 34 and 36, 38 and 40, being included as a part of the cutting blade. The two relatively larger holes 8 and 10 are provided to make the succeeding forming operation easier, that is, to permit a more facile flow or stretching of the metal to form relatively larger holes in the side walls of the pitting blades as hereinafter set forth. In addition, these holes provide clearance for the sides of the pit as the blades cut from either side of the pit to remove the pit from the half peach. That is, as the blades move around the bottom edge of the pit, as shown in Figures 12 to 15 inclusive, the central portions of the pit transversely of its long axis project considerably outwardly and the blades are therefore provided with holes through which the sides of the pit may slightly project to provide the necessary clearance for an efficient pitting action, as is illustrated in Figures 14 and 15 where the lateral edges of the pit slightly project through the openings, as hereinafter described. The holes 12 and 14 are located in pairs on the opposite sides of the central axis 16 of the blank. Preferably these holes are located in spaced relation and spaced on either side of the longitudinal axis 18 of the blank and function to receive bolts or fastening means to fasten the blades to the pitting blade carriers 178 and 180, as shown in Figure 12.

In the next operation, as shown in Figures 3 and 4, the curved ends 18 and 20 of the blank are bevelled as at 42 and 44, preferably by a circular milling operation. The resultant edges, such as 46 and 48 are left about one thirty-second of an inch thick.

The blanks are now placed in a forming die and the blades are cold formed simultaneously in the die in an hydraulic press with a pressure of about 25 tons which forms the outer ends of the blank in the manner shown in Figures 5 and 6 to form at said outer edge the curved or bowed blade portion of the blank as shown at 50 and 52. During this operation the holes 8 and 10 are stretched to substantially oval or ovate form as shown in Figure 5. The next operation consists in placing the partially formed blanks in a die having a punch which shears the two blades apart along the lines 54 and 56 to produce the two separate, partially formed blades shown in Figure 7. The next operation consists in grinding the cutting edge of the blades to a cutting sharpness. Figures 8 to 16 show the two blades that have cut around the half pit and are overlapping about one-eighth of an inch. To obtain this result the forming die for the right hand blade, marked R in Figures 8 and 16, puts a greater inward curve to the blade, such as is shown at 58, and a corresponding lesser curve 60 to the left hand blade so that when both blades are ground on the outside as at 62 and 64 they will meet in overlapping close proximity to each other. By reference to Figure 11 particularly, it will be noted that the diameter 66 as indicated by this line on the right hand blade is of slightly greater dimension than the diameter 68 of the left hand blade, which provides for the overlapping arrangement of these blades. In the forming operation it will be noted that the holes 8 and 10 have become greatly enlarged so that they are formed not only in the upper curved portion 70 and 72 of the blades, but the opening also projects into the flat portions 74 and 76 constituting the shank of the blade which attaches to the blade carrier. It will also be noted that the rounded portions 46 and 48 forming the curvilinear cutting edge of the blade blank, after the blade has been suitably formed in the forming die, now becomes a continuous curved and bulged out cutting edge 80 and 82, and it will be further noted from Figure 16 that the side edges 30 and 32 of each blade are substantially straight and extend from the rear corner 84 of each blade shank portion 74 to the outer curved end 86 of each blade, forming a substantially straight side for the blade, and the cutting edge extends from each of the corners 86 around in curvilinear fashion to the opposite corner 90.

It will be noted by reference to Figures 9, 10 and 16 that the blade in a sense comprises a shank portion which is flat and generally rectangular and is used for attaching the blades to the pitter carriers 178 and 180. This flat portion extends from the top edge 92 of the blank down to approximately the line 94. This dimension is approximately seven-tenths of an inch of the overall length of the blank of one and nine-tenths inches from the line 92 to the line 96 which marks the outermost end of the curved line 80 of the blade. The opening in the blade, taken in a direction from the edge 92 toward the line 96 is approximately seven-tenths of an inch and the bulged portion of the blade which begins approximately at the line 94 continues clear down to the outer cutting edge at the line 96. The dimension of this curved portion is slightly more than one inch. It will be noted that when the blade is bent to final form and the hole consequently enlarged by bending the blade in a form, that the hole is enlarged so that it comprises a considerable part of the shank portion 74 as well as a considerable portion of the bowed portion 70, and that the bulged or curved portion of the blade extends a substantial distance beyond the lowermost edge 98 of the hole, leaving a curved portion of the blade extending between the lowermost portion 98 of the hole and the outer curved cutting edge 80 substantially seven-tenths of an inch, in short, that the dimension as shown in Figure 9, from the edge 98 of the hole to the portion 96, and which dimension is herein called 100, is substantially seven-tenths of an inch. In the present blade the edge is not dull or blunt but is sharp and continuously circular and devoid of any points so as to perform a clean or smooth pitting cut in the half fruit, which cavity thus cut is completely devoid of serrations or ridges as heretofore made by prior pitting blades. It is to be noted that the bevelling of this blade occurs wholly on the exterior thereof and that the inner portion of the blade as shown to the right in Figure 8 is completely smooth and free of any bevels such as are present on the exterior side of the blade as is indicated at 102 in Figure 10. In Figure 10 the line 104 indicates where the sharpening process begins. The sharpening process begins at the line 104 and ends at the line 106, which is the bottom cutting edge of the blade. The blade, from the line 104 up to the line 108, which is the same as the edge 98 of the hole, is not sharpened but is a part of the unsharpened blank as the blades come out of the forming, shaping or cold forging mold. It is to be understood by reference to Figures 5 and 6 that when these forming dies form the blade, they form the right hand curvature of the blade differently from the left hand side of the blade, so as to cause the overlapping as shown in Figure 11 by reference to the lines 66 and 68.

It is apparent that many widely different embodiments of this invention may be made without departing from the spirit and scope thereof, and therefore it is not intended to be limited except as indicated in the appended claims.

Having thus described the invention, what I claim as new and desire to secure by Letters Patent is:

1. The method of forming a pitter blade comprising cutting a generally rectangular blank from flat metal strip having a generally uniform thickness of the order of .109 of an inch and wherein the opposed ends of said flat blank thus formed are arcuately convex and are joined to parallel sides of the blank by diagonally, outwardly extending, relatively shorter edges, making a pair of relatively larger holes through the blank thus formed, the centers of said holes being located on the central longitudinal axis of the blank and the holes being positioned thereon substantially midway between the central transverse axis of the blank and the intersection of said longitudinal axis with each arcuately convex end edge of the blank, and also forming a plurality of relatively smaller holes in the blank on each side of and spaced from said relatively larger holes, bevelling the convex arcuate ends of the blank in a manner to leave said arcuate ends of the blank about one thirty-second of an inch thick, bending the opposed end portions of the blank laterally outwardly in the same direction with respect to the plane of the blank to form curved, outwardly bulged blade forming portions integrally joined to said flat shank portion and whereby to cause the relatively larger holes to become substantially enlarged, thereafter shearing the blank substantially along its transverse central axis to provide two separate blade sections and grinding the curved cutting edges of the blades to cutting sharpness.

2. The method of forming a pitter blade comprising punching a generally rectangular blank from a relatively thin metal strip and wherein the opposed ends of said blank thus punched are arcuately convex and are joined to parallel sides of the blank by diagonally, outwardly extending, relatively shorter edges, punching a pair of relatively larger holes through the blank thus formed, the centers of said holes being located on the central longitudinal axis of the blank and the holes being imposed thereon substantially midway between the central transverse axis of the blank and the intersection of said longitudinal axis with each arcuately convex end edge of the blank, and likewise punching a plurality of relatively smaller holes in each side of and spaced from said relatively larger holes, bevelling the convex arcuate ends of the blank in a manner to leave said arcuate ends of the blank about one and one thirty-second of an inch thick, bending the opposed ends of the blank to form outwardly bulged curvilinear blade ends, one of said ends being bent on a greater diameter than the other whereby to cause the curvilinear ends of the blades to overlap approximately one eighth of an inch, and thereafter shearing the blank substantially along its transverse central axis to provide two separate blade sections, and grinding the curved cutting edges of the blades to cutting sharpness.

3. A pitting blade for a power operated pitter comprising a flat metallic shank having parallel sides and having an outer edge transversely disposed thereto, said shank having fastening means for attaching the blade to a pitter carrier, said shank portion of said blade having an integral extension bent outwardly out of the plane of the shank portion in curvilinear formation to provide a laterally bulging curved pit receiving portion the lower end of which forms a cutting edge, the sides of said curved bulging portion being generally parallel and forming extensions of the parallel sides of said shank portion, the curved edge of said bulged portion forming a continuous unbroken curved cutting edge extending from one of said parallel sides of the blade portion to the opposite parallel sides of the blade portion, the outer lower face adjacent said curved lower edge being bevel ground to provide a relatively sharp cutting edge and said shank and bulged portions of said blade being formed with a relatively large aperture, a portion of the periphery of the aperture extending substantially into said shank portion of the blade and the remainder of said opening being coextensive with the bulged portion of said blade and projecting substantially halfway of the length of said bulged portion in the direction toward the cutting edge of said blade, and the width of the opening in a transverse direction being greater than one third of the width of the blade.

4. A pitting blade for a power operated pitter comprising a flat metallic shank having parallel sides and having an outer edge transversely disposed thereto, said shank having fastening means for attaching the blade to a pitter carrier, said shank portion of said blade having an integral extension bent outwardly out of the plane of the shank portion in curvilinear formation to provide a laterally bulging curved pit receiving portion the lower end of which forms a cutting edge, the sides of said curved bulging portion being generally parallel and forming extensions of the parallel sides of said shank portion, the curved edge of said bulged portion forming a continuous unbroken curved cutting edge extending from one of said parallel sides of the blade portion to the opposite parallel sides of the blade portion, the outer lower face adjacent said curved lower edge being bevel ground to provide a relatively sharp cutting edge and said shank and bulged portions of said blade being formed with a relatively large aperture, a portion of the periphery of the aperture extending substantially into said shank portion of the blade and the remainder of said opening being coextensive with the bulged portion of said blade and projecting substantially halfway of the length of said bulged portion in the direction toward the cutting edge of said blade, and the width of the opening in a transverse direction being greater than one third of the width of the blade, that part of the bulged portion of the blade between the lower edge of the opening and the cutting edge of the blade being greater than one half of the overall length of the bulged portion of the blade taken in a direction parallel to one of the parallel sides of the blade.

5. A pair of pitting blades for a power operated pitter, each blade comprising a flat shank portion having parallel sides and carrying fastening means whereby each of said blades may be attached to a pair of pitter carriers, each of said blades having integral extensions of the shank portion which bulge laterally outwardly in curvilinear formation from said shank portion continuously to a lower cutting edge, the sides of said bulged portion being parallel and forming continuations of the parallel sides of the shank portion and the cutting edge extending continuously between the sides of said bulged portion, the curvilinear formation of one of said blades being of different formation than the other whereby when said blades are swung arcuately about a common center so that the cutting edges meet, said blades will overlap in the order of one eighth of an inch, more or less, each of said blades having a relatively large opening formed therein, a substantial portion of the upper sector of the opening being formed in the flat shank portion and the remaining lower portion of said sector being formed in the laterally bulged curvilinear portion of said blade, the outwardly bulged curvilinear portion of the blade being disposed between the lower edge of the opening and the cutting edge of the blade, being greater than one half of the length of the bulged portion of the blade taken in a direction parallel to one of the parallel edges of the blade.

HENRY A. SKOG.

No references cited.